April 28, 1936.  L. B. LENT  2,038,581
AUTOMOBILE
Filed July 11, 1933  2 Sheets-Sheet 1
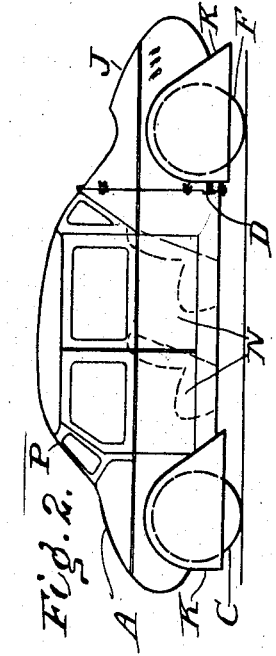
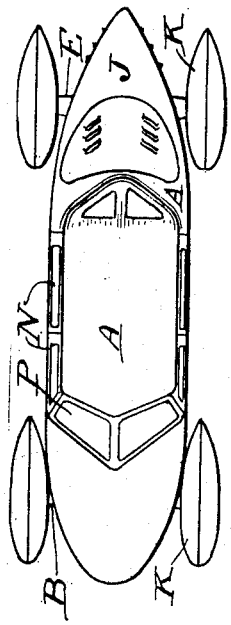
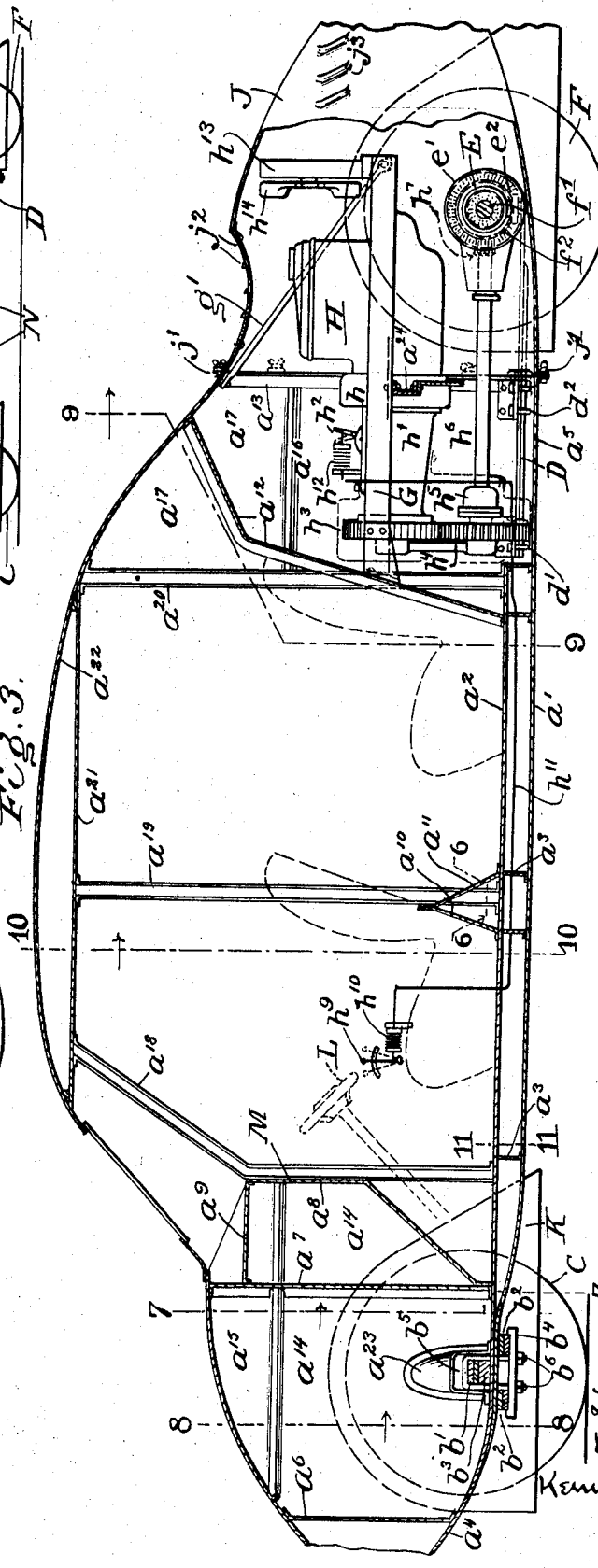
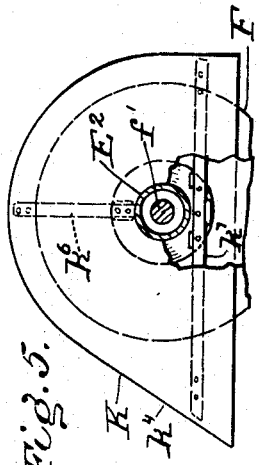
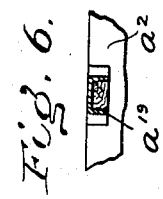
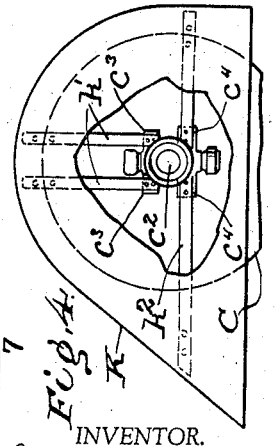
INVENTOR.
Leon B. Lent
by Morrison,
Kennedy & Campbell
ATTORNEYS.

April 28, 1936. L. B. LENT 2,038,581
AUTOMOBILE
Filed July 11, 1933 2 Sheets-Sheet 2
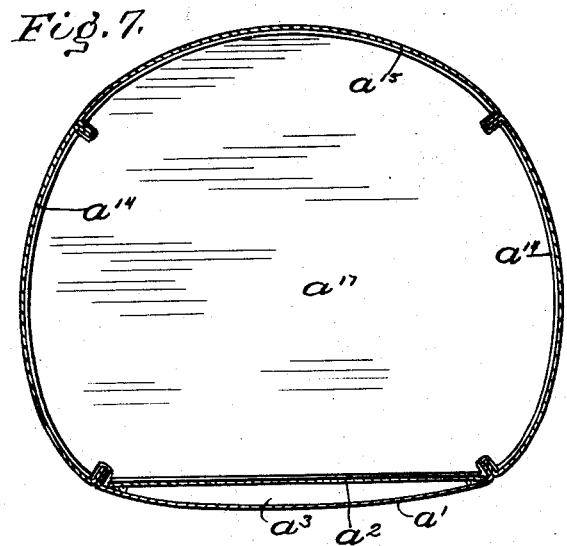
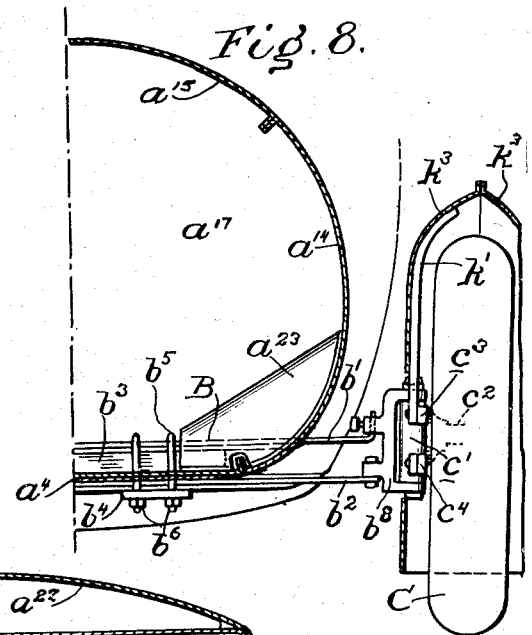
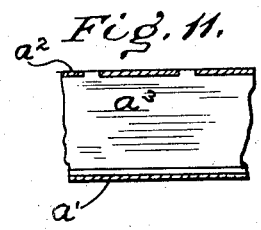
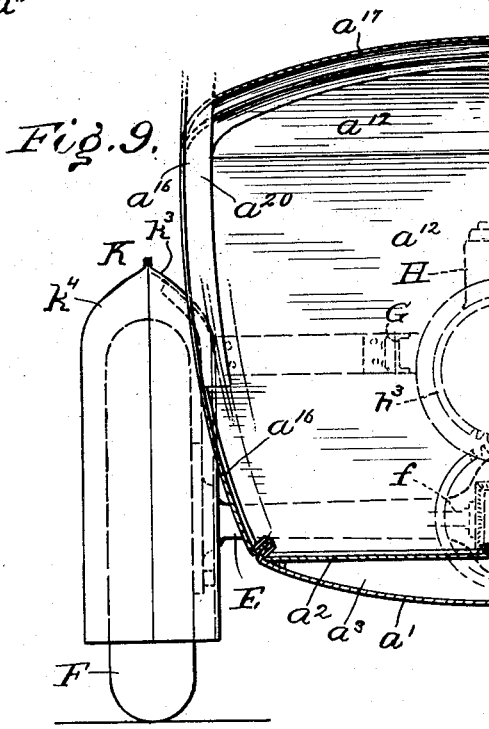
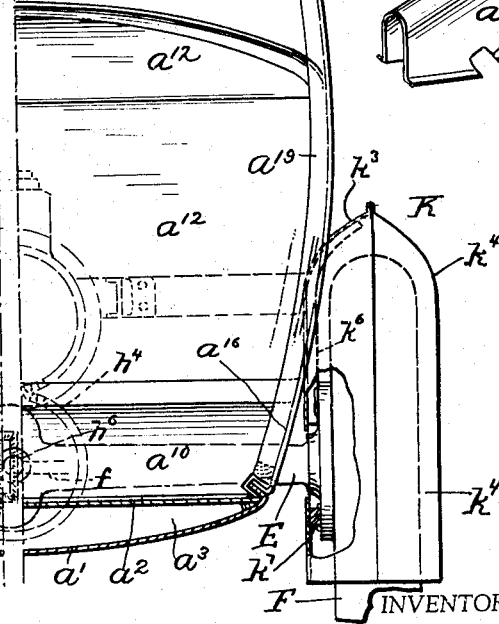
INVENTOR:
Leon B. Lent
BY Morrison, Kennedy & Campbell
ATTORNEYS.

Patented Apr. 28, 1936

2,038,581

UNITED STATES PATENT OFFICE 2,038,581

AUTOMOBILE

Leon B. Lent, Buffalo, N. Y., assignor of one-half to Harvey Deuell, New York, N. Y.

Application July 11, 1933, Serial No. 679,867

2 Claims. (Cl. 180—1)

This invention is a novel automobile, or power driven road vehicle, and is applicable to various types of automobiles, including both commercial trucks and passenger cars.

The conditions to which an automobile is subjected in practical use render its requirements distinctly different from any other kind of vehicle. The necessity of operating over roads or other surfaces sometimes of extreme irregularity or roughness; the necessity of heavy weight due to the carrying of the power plant by the vehicle; and the requirement of high speed of travel against air resistance; combine to present difficulties and complications which are the constant subject of efforts to overcome.

The main object of the present invention is to improve generally the construction, operation and efficiency of automobiles with the above mentioned difficulties in view. A special object is to simplify substantially the construction of automobiles; and thereby to reduce cost of manufacture. A further object is to afford substantial reduction of weight; the greater lightness not only proportionately reducing the strains created in practical service, but increasing acceleration and bettering performance.

A further object is to afford a construction insuring adequate strength notwithstanding simplification and lightening. Another object is to minimize the unsprung weight of the car. Another object is to render the power plant, transmission and drive wheels a separable unit readily demountable from the car. Another object is to accommodate with the purposes mentioned a practical shape or design which will minimize air resistance and thereby reduce power requirements and operating costs while increasing speeds; this involving an external contour of shell which is substantially smooth and unbroken, for low air resistance, popularly referred to as streamlining.

Other and further objects and advantages will be explained in the hereinafter following description of an illustrative embodiment of the invention or will be understood by those conversant with the subject.

The typical modern automobile is a somewhat complicated structure. For comparison purposes some of its chief characteristics will here be mentioned. The best known type of automobile consists of two distinct and separable units, the body and the chassis; the body being a built-up structure with covering panels and door and window frames all preassembled, and with sills adapted to be rested upon and bolted to and removed from the frame of the chassis; the chassis consisting of its main frame with longitudinal and cross rails or members, usually channels or beams of pressed steel, this frame carrying the operating elements, power plant, transmission mechanism, steering mechanism and braking system, and such chassis frame resting upon the resilient suspension or springs, of elliptic or other form, the springs in turn being mounted upon the non-rotating axles, usually below the chassis frame, and the axles carrying the wheels, four or three in number, the front or steering wheels usually mounted on knuckles carried by the yoked ends of the front axle. As will be developed in the hereinafter following description the present invention discards a number of the established principles of automobile construction and presents radically new principles intended to meet the objects hereinbefore recited.

In the accompanying drawings Figure 1 is a general top view and Fig. 2 is a general side elevation, both on a small scale, of an automobile embodying the principles of the present invention.

Fig. 3, on a larger scale, is a substantially central longitudinal vertical section of the automobile shown in Figs. 1 and 2.

Fig. 4 is a side elevation of a front wheel and adjacent parts, partly broken away to shown interior construction; and Fig. 5 is a similar side elevation view of a rear wheel.

Fig. 6 is a horizontal section of a detail of construction taken on the section line 6—6 of Fig. 3.

Fig. 7 is a general transverse section taken on the vertical line 7—7 of Fig. 3; while Fig. 8 is a similar section taken on the line 8—8 of Fig. 3, and showing in front elevation certain details of a front wheel and suspension.

Fig. 9 is a vertical section taken on the crooked line 9—9 of Fig. 3, looking from the front and showing the right rear wheel, while Fig. 10 is a similar section taken on the vertical line 10—10 of Fig. 3, and showing the left rear wheel.

Fig. 11 is a vertical section of a detail taken on the line 11—11 of Fig. 3.

Fig. 12 is a perspective view of a certain strengthening member shown also in Figs. 3 and 8.

The same reference characters indicate corresponding parts in the several figures of the drawings.

In one aspect the invention may be described as an automobile comprising a strong, unitary and rigid metal shell constituting both the frame (chassis) and body of the automobile, and extending between the front and rear suspension points, and supporting the power plant, steering mechanism, transmission and braking systems, etc.; with suspension springs attached to the lower part of such shell, and front and rear wheels having the supports on which they rotate, namely—the spindles of the front or steering wheels and the axle sleeve or housing of the other or rear wheels, connected to the ends of such springs.

The first mentioned or main element or shell A, so marked in Figs. 1 and 2, is a combined body and frame, and may be referred to as a frame-body. It not only determines the style and type of car and contains the seating space, but is the main strength member of the car, being designed and constructed with due regard to the principles of a truss, utilizing for the strength of the vehicle the entire or partial depth of the body, all in decided contrast with the usual chassis frame constructed of horizontal channel members of heavy construction and high strength, upon which the usual body is attachable and detachable.

The described body or braced shell A possesses the strength to carry the load between the front and rear wheels or suspension points. This and the following described main elements are illustrated on Figs. 1, 2 and 3, the remaining figures developing the details of construction. Thus at the front end are shown the front suspension springs B, at the ends of which are mounted the front spindles or wheel supports and front or steering wheels C. At the rear end similarly are the rear or driving wheel mountings; illustratively shown as adapted for the usual arrangement of opposite driving wheels, namely—rear springs D in supporting connection to the tubular support or rear axle E and rear wheels F with their shafts and differential. Near the rear end is a sub-frame G which may be detached with the rear or driving wheels and which carries the power plant or engine H and the transmission connections; the power plant thus being preferably at the rear or adjacent to the driving wheels. The engine is enclosed, but rendered accessible, by a removable rear hood or housing J.

Each of the four wheels preferably is enclosed in a separate wheel housing K, set outwards of the streamline contour of the body, and each such wheel housing being itself streamlined and preferably openable at the exterior for access to the wheels and tires.

Inside the vehicle a steering wheel L is indicated, its connections however to the front wheels being omitted, as they may be of any well known kind. In front of the steering wheel is shown an instrument board M which may be one of the frame-body strength members. Figs. 1 and 2 show convenient doors N, which of course will be varied in number, arrangement and construction in accordance with the style or type of automobile; and at the front end the frame-body is constructed to accommodate a windshield P of any desired type or form.

The frame-body A, of substantial vertical depth and of truss construction, composed of an outer shell with interior brace members, may be variously constructed, for example as in the illustrated embodiment, described as follows: At its underside the frame-body is preferably of box girder form, constituting a sill, as plainly shown in Figs. 3, 7, 8 and 9 with a horizontal under plate $a'$ and an upper plate $a^2$ spaced slightly from it by a number of vertical cross plates $a^3$, all preferably welded unitarily, as are preferably other joints throughout the frame-body. As seen in Fig. 11 the cross plates $a^3$ may have small lugs extending into corresponding perforations in the horizontal plates $a^2$ to assist welding at this point. The sill, by one of its horizontal plates is shown as extended forwardly at $a^4$ and rearwardly at $a^5$, these extensions continuing to or beyond the suspension points or locations of attachment of the suspension springs to the frame-body. The box girder sill is particularly useful in a four wheel vehicle, giving resistance to twist or torsion of the frame-body; and is not so important in a three-wheel automobile.

Above this bottom member or sill are a number of transverse frame members in the nature of partitions or bulkheads attached or welded upon the sill or bottom and to the panels to be described. The front such transverse frame member $a^6$ is near the extreme front or nose. The second such member or bulkhead $a^7$ is somewhat to the rear of the front axles, attached upon the sill plate $a^2$. The third such bulkhead $a^8$ may also be the backing for the instrument board M, it being attached directly or indirectly upon the sill plate $a^2$ and at its top end having a horizontal connecting plate $a^9$ extending forwardly to the bulkhead $a^7$, thus affording an upright box girder between these four elements. The lower part of the bulkhead $a^8$ may be cut out to afford leg room, or preferably this bulkhead is bent forwardly as shown, having its lower end welded or attached either to the sill plate $a^2$ or the bulkhead $a^7$.

Upon the sill, near its center, are front and rear angle braces $a^{10}$ and $a^{11}$ welded to the sill and to each other, these extending the full width of the frame-body, supplementing its strength, and serving as a column connection. Another or fourth bulkhead $a^{12}$ is shown near the rear end of the box girder of the sill, this extending upwardly at a slight rear incline and being thereabove bent to a flatter incline to meet the outer deck plate to be described. The bulkheads $a^6$, $a^7$, $a^8$ and $a^{12}$ are preferably closed, while to the rear of these, at the extreme rear end of the body is shown an open bulkhead $a^{13}$, flanged for strength, and accommodating portions of the power plant. The incline of members $a^{10}$ and $a^{12}$ accommodates them to the incline of the seats indicated in dotted lines. The term bulkhead is used in this patent in the sense of any strong and stiff interior transverse frame member, assembly or partition, whether open or closed, which affords transverse bracing to the shell in vertical, horizontal and diagonal directions, and is thereby adapted to resist torsional strains upon the frame body.

Except for the doorways the outer sides and top of the frame-body are preferably enclosed by plate steel, in the form of panels or otherwise. Thus at the front, as seen in Figs. 3, 7 and 8, are side panels $a^{14}$ extending from the nose rearwardly to the bulkhead $a^8$. These panels are connected below to the sill and above are connected to each other by a front top panel $a^{15}$. To the rear of the doorways are side panels $a^{16}$ and the top edges of these are connected by the curved rear top panel $a^{17}$. The weld line or connection between the front panels $a^{14}$ and $a^{15}$ preferably alines with that between the rear panels $a^{16}$ and $a^{17}$, and as shown in Fig. 2 the visual effect thus produced may be carried out by similar horizontal lines applied to the doors N and to the removable rear hood J. The side panels $a^{14}$ and $a^{16}$ may be unitary, with a stretch extending underneath the doorways as shown.

It is important to strengthen and brace the middle part of the truss, subject to the greater strain, especially in view of the fact that the doorways are at this point. To this end a system of vertical columns is provided, between each two of which a door may be located. Thus a front column $a^{18}$ is shown rising adjacently to and preferably connected with the bulkhead $a^8$, but taking a bend at its upper part to conform with the exterior contour of the frame-body. In the case of a four-door car there is also a middle column $a^{19}$ and this may stand in braced relation to the angle braces $a^{10}$ and $a^{11}$. There is also a rear column $a^{20}$. Each of the three described columns is duplicated at the two sides of the car and each of them is attached or welded to the sill. Each may be in the form of a channel, filled with a strip of wood, as indicated in Fig. 6, the wood serving for purposes of attachment of upholstery, door hinges and the like.

The truss constituted by the frame-body is practically completed by a top member or deck in the case of a closed car; and this is shown as composed of a deck bottom plate $a^{21}$ and a deck top plate $a^{22}$ spaced somewhat above $a^{21}$, the two however preferably converging at front and rear by reason of a convex or streamlined curvature to the top plate. These combined deck plates constitute substantially a box girder along the top of the frame-body, and the flanged top ends of all of the six column members are attached or welded to the deck. Additionally of course various strengthening members, gussets and the like may be provided at various points; for example at each side is shown an interior gusset $a^{23}$, see Figs. 3, 8 and 12, rigidly interconnecting the sill extension $a^4$ and the adjacent side panel $a^{14}$, and having an arched form to accommodate the front spring clips to be described.

Referring next to the front suspension, the usual front axle is wholly omitted, and the front springs B are mounted directly on the frame-body and separately carry the wheels. The front spring is shown as consisting of an upper spring $b'$ and two lower springs $b^2$, see Figs. 3 and 8. Below the upper spring is a filling piece or support $b^3$, spacing it above the sill extension $a^4$, while the under springs $b^2$ are preferably below the sill member. The springs may conveniently be mounted or clipped in place at each side by a clip plate $b^4$ below the under springs and a pair of inverted stirrups $b^5$ extending around the upper spring and down through apertures in the clip plate, where nuts $b^6$ or other attachments are applied to afford a permanent rigid mounting. The springs are arranged transversely and their ends project beyond the frame-body to receive the front or steering wheel mountings.

The front springs may carry the front wheels by a mounting arrangement such as the following. At the outer ends of the three springs is arranged a spring head or yoke $b^8$, having therefore a three point attachment to the springs and being relatively movable vertically, as the springs undergo yield or play, in parallelism. Pivotally mounted on the yoke $b^8$ is a steering knuckle $c'$ which as usual may turn about a vertical axis and may have connections to the steering wheel for turning it to swing the front wheel. Projecting outwardly from the knuckle $c'$ is the front wheel spindle $c^2$, which is in the nature of an axle but will be herein termed the support on which the wheel turns. The steering knuckle is shown provided with upper and lower ears $c^3$ and $c^4$ to carry the wheel housing K.

The streamline housing K for each front wheel, see Figs. 4 and 8, may be mounted upon vertical brackets $k'$ attached to the upper ears $c^3$ of the steering knuckle and upon horizontal brackets $k^2$ similarly attached to the lower ears $c^4$. The housing itself is shown composed of an inner housing part $k^3$ attached to the four brackets described and an outer portion or half $k^4$ arranged to be readily removable for access to the wheel, for change of tires, etc. The rear wheels may have streamlined housings K similar to the front wheels. As shown in Figs. 3 and 6, an upright bracket $k^6$ is mounted on the rear axle and below the axle is a horizontal bracket $k^7$, these two brackets having the inner half of the housing attached to them, the outer half being readily removable.

Referring next to the rear suspension, the rear springs D may be arranged longitudinally, one at each side of the vehicle. By forward and rear clips $d'$ and $d^2$ each spring is securely mounted to a side panel or the sill of the frame-body, and each spring extends rearwardly beyond its mountings to where it gives support to the rear axle E. The two ends of the rear axle are thus separately spring-mounted at or beyond the rear end of the frame-body.

The rear axle E, constituting the support on which the rear wheels rotate, is shown in Fig. 3 attached by clips $e^2$ upon the free or rear ends of the springs D. This may be the usual tubular form of non-rotating axle, its middle portion being expanded into a differential housing $e'$. The rear wheels F may be attached to the usual rotary shafts $f'$ interconnected by the usual differential gear $f^2$. It should be noted that the rear wheel axle and differential constitute substantially the only unsprung weight in the described motor car.

As already stated it is preferred that the rear wheels with drive connections and power plant should be detachable as a unit. To permit the the demountable frame G is arranged to have detachable connections $a^{24}$ to the bulkhead $a^{13}$ near its front end, and there are shown diagonal stay rods $g'$ at its rear end. This frame constitutes a support for the engine H and connected drive parts including the clutch $h$, the transmission mechanism $h'$ operated by shift lever $h^2$ and the spur gear $h^3$. Below the gear $h^3$ is a meshing spur gear $h^4$ connected by a universal $h^5$ with a spur propeller shaft $h^6$ extending to the driving pinion $h^7$ of the differential $f^2$. The housing of the transmission is indicated in dotted lines as extended to house the gears $h^3$ and $h^4$. This entire power plant unit is readily detachable by demounting the subframe G as described and by unclipping the rear axle from the springs D; thus permitting ready repair or replacement.

As a convenient means of transmitting gear shift control from the driver's seat to the transmission $h'$ the following is illustrated. Adjacent the driver's seat is a shift handle $h^9$ of usual kind movable between four positions, two at each side, and arranged to be locked in any position. Directly operated by the lever $h^9$ is shown a hydraulic device $h^{10}$ which may consist of a metallic bellows, thus operated either to eject liquid into or draw liquid from a pipe line $h^{11}$ extending to a corresponding rear bellows $h^{12}$ having a similar connection to the shift lever $h^2$. These elements $h^{10}$, $h^{11}$, $h^{12}$ and $h^2$ may be in duplicate, the second directly behind the first, one set or the other being actuated according to the lateral shift of lever $h^9$, and the levers $h^2$ effecting the gear shifts in a usual way. By this or other suitable type of connection remote control is afforded whereby the actual shift lever $h^2$ always takes an adjustment corresponding to that of the hand operated shift lever $h^9$. Springs may press forwardly on the lever $h^2$ to oppose the compression and assist the suction of the liquid.

The removable rear hood J may be shaped to carry out the streamline contour of the automobile. It may be secured in place by readily openable attaching devices $j'$. The upper front part of the hood may have an opening $j^2$ containing louvers for the admission of air to cool the engine H and radiator $h^{13}$, a fan $h^{14}$ assisting in this operation and the hood being provided with rear or exit louvers or openings $j^3$.

In essence the present invention comprises the described or analogous frame-body, supporting the load, and adapted to resist flexure, torsion and shear, with the suspension springs secured to the frame-body and in turn supported by the wheels, the frame-body carrying the power plant, steering system etc. Lightness, strength, speed, riding comfort and safety and the other stated advantages are attained.

This system of construction admirably lends itself to the minimizing of air resistance by streamline contours, for example as illustrated. The bracing is interior and the sheet metal exterior is smooth and curved upon aerodynamic principles, with a well rounded bow or nose, and a tail extended well rearward substantially to a point to minimize rear suction and eddy currents. The wheels are independently housed by streamline coverings minimizing resistance.

There has thus been described an automobile or power driven road vehicle attaining the objects and advantages of the present invention. Since various matters of design, construction and detail may be modified without departing from the principles of the invention, it is not intended to limit the invention to such matters except to the extent set forth in the respective appended claims.

What is claimed is:

1. A closed automobile construction comprising a frame-body consisting of a strong and rigid unitary sheet-metal shell of substantial vertical depth constituting both the longitudinal frame and the body of the automobile and extending between the automobile front and rear suspension points, a power plant and a steering mechanism, both supported by said frame-body, and front and rear wheels having at said suspension points spring-connected supports on which the wheels rotate; said sheet-metal shell or frame-body being of substantially smooth and unbroken external contour for low air resistance; and having a rigid girder-strengthened overhead deck of substantial length and convex contour merging into the front and rear frame-body contour; the frame-body sides having the shell interrupted for side doorways, with said overhead deck overlying such doorways; a long girder-strengthened sill underlying such doorways; and the frame-body having an interior reenforcing system including columns extending between sill and deck and including transverse bulkheads to the front of and rear of such doorways, such columns and bulkheads constituting with the shell sides strong interconnections between deck and sill and therewith affording a truss effect in the frame-body as a whole; whereby the so-reenforced metal-shell frame-body can assume safely the transverse and longitudinal flexing stresses, the tension and compression stresses, and the torsional stresses, occurring in road vehicle driving.

2. A closed automobile construction comprising a frame-body consisting of a strong and rigid sheet-metal shell of substantially smooth and unbroken external contour for low air resistance, said shell being of substantial vertical depth and constituting both the longitudinal frame and the body of the automobile and extending between the automobile front and rear suspension points, a power plant and a steering mechanism, both supported by said frame body, and front and rear wheels having at said suspension points spring-connected supports on which the wheels rotate; said sheet-metal shell or frame-body having a rigid girder-strengthened overhead deck of substantial length and of contour merging with the general smooth shell contour to the front and rear thereof; the frame-body sides having the shell interrupted for side doorways, with said overhead deck overlying such doorways; a long girder-strengthened sill underlying such doorways; and the frame-body having an interior reenforcing system including columns extending between said sill and deck and including transverse bulkheads located not to obstruct such doorways, such columns and bulkheads constituting with the shell sides strong interconnections between deck and sill and therewith affording a truss effect in the frame-body as a whole; whereby the so-reenforced metal-shell frame-body can assume safely the transverse and longitudinal flexing stresses, the tension and compression stresses, and the torsional stresses, occurring in road vehicle driving.

LEON B. LENT.